Figure 5:
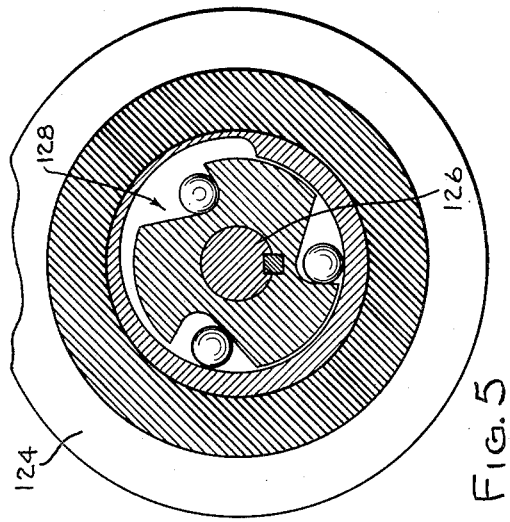

Nov. 23, 1954          L. W. BIRBAUM          2,694,937
AUTOMATIC TRANSMISSION
Filed Sept. 15, 1950          2 Sheets-Sheet 1
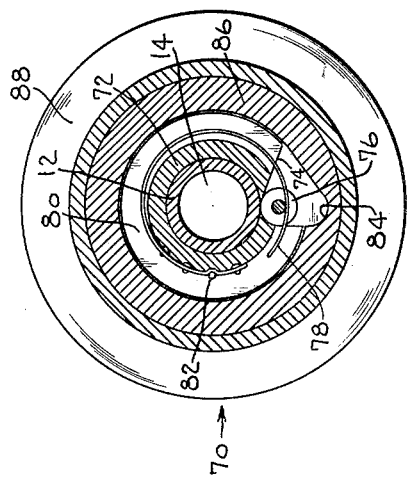
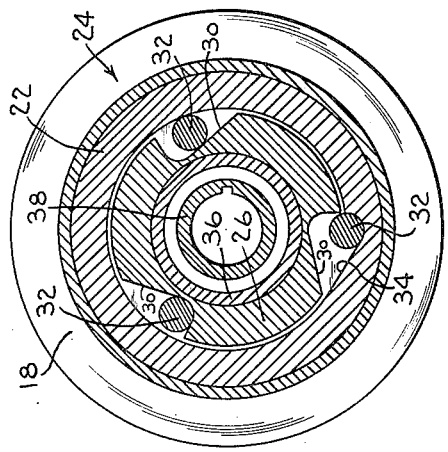
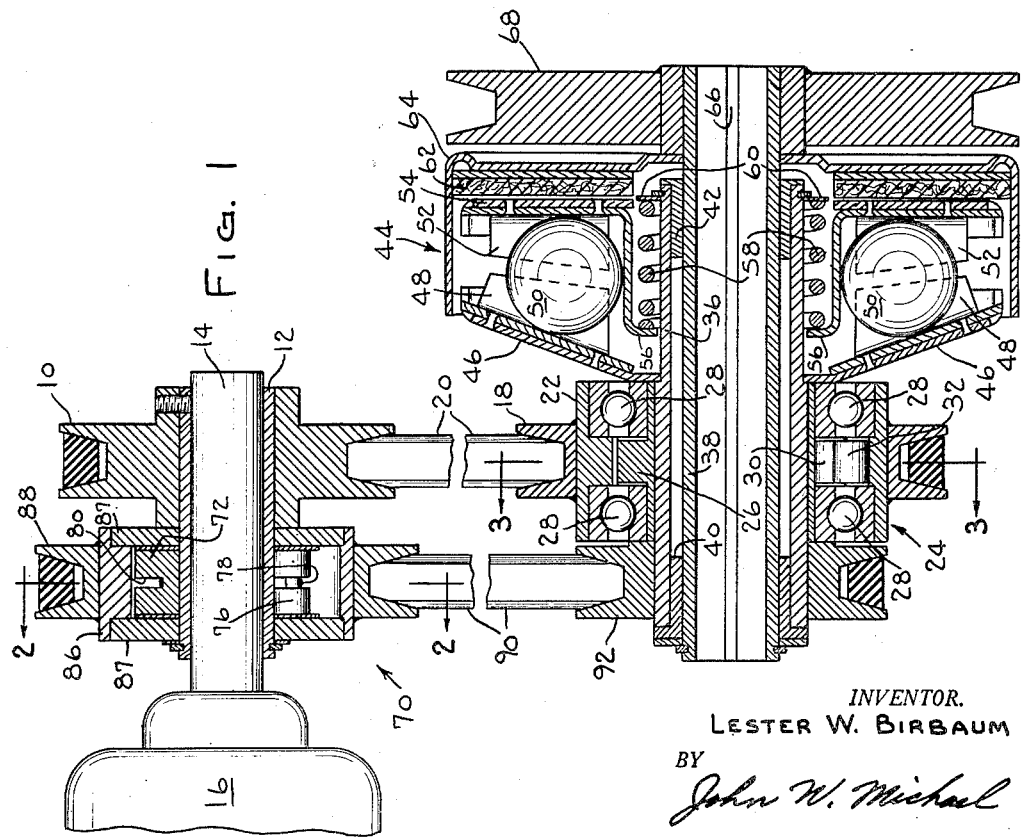
INVENTOR.
LESTER W. BIRBAUM
BY
John W. Michael
ATTORNEY Nov. 23, 1954  L. W. BIRBAUM  2,694,937
AUTOMATIC TRANSMISSION Filed Sept. 15, 1950  2 Sheets-Sheet 2

INVENTOR.
LESTER W. BIRBAUM
BY
John W. Michael
ATTORNEY

United States Patent Office 2,694,937
Patented Nov. 23, 1954

2,694,937

AUTOMATIC TRANSMISSION

Lester W. Birbaum, Oconomowoc, Wis., assignor to La Belle Industries, Inc., Oconomowoc, Wis., a corporation of Wisconsin Application September 15, 1950, Serial No. 185,078

17 Claims. (Cl. 74—336)

This invention relates to an automatic transmission. More particularly, this invention relates to a transmission for automatically engaging an engine shaft to a driven shaft when the engine shaft exceeds a predetermined speed and for automatically selecting speed ratios between the shafts when the shafts are engaged.

This transmission is designed for use with small power implements and motor vehicles, for example. The transmission incorporates an automatic multiple drive from an engine shaft to the input side of a speed responsive clutch, the output of which drives a driven shaft. With this arrangement the engine may idle without turning the driven shaft. When the speed responsive clutch engages, the transmission initially provides a low speed ratio. As the engine speed increases after picking up the load, the transmission automatically shifts into a higher speed ratio. Should the engine become overloaded and tend to stall, the speed ratio may be reduced. The output shaft can override the engine, but as soon as the output speed drops sufficiently the transmission will re-engage. The transmission is comprised of simple components and need not employ gearing. The simplicity makes low cost production possible.

An object of this invention is to provide a simple, reliable automatic transmission which may be produced at low cost.

Another object is to provide a multiple speed automatic transmission combined with a speed responsive clutch.

Figure 6:
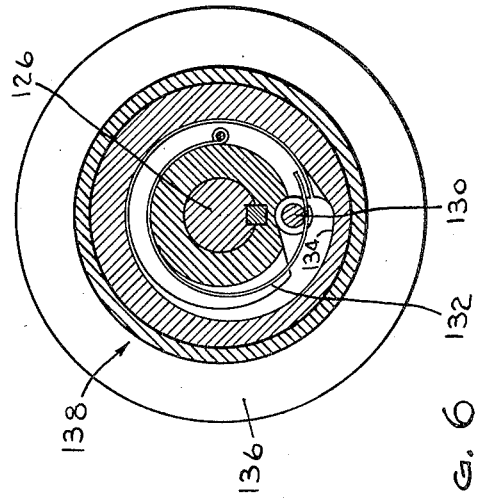
Figure 4:
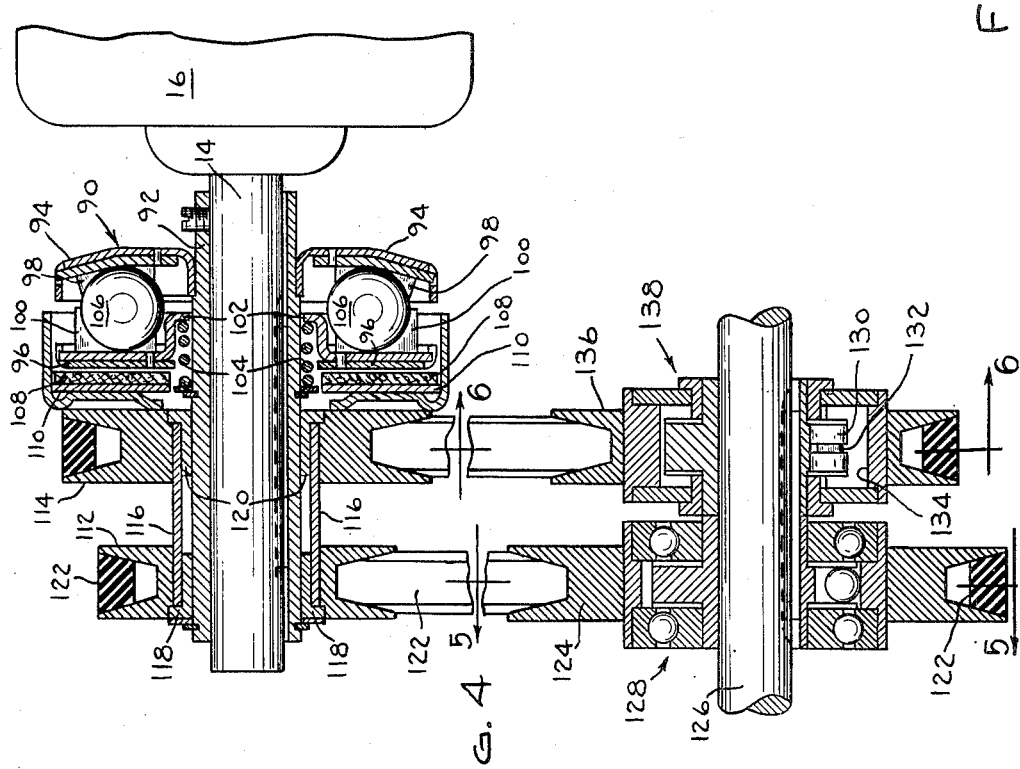

Other objects and advantages will be pointed out in, or be apparent from, the specification and claims, as will obvious modifications of the two embodiments shown in the drawings, in which:

Fig. 1 is a partly schematic section through one form of a transmission according to this invention;

Figs. 2 and 3 are sections taken as indicated by lines 2—2 and 3—3 on Fig. 1; and Figs. 4 through 6 are similar to Figs. 1 through 3 but show another modification of the transmission.

Referring to Figs. 1 through 3 in detail, sheave 10 is connected to sleeve 12 fixed on shaft 14 and projecting from engine housing 16. When the engine is running, sheave 10 drives sheave 18 through V-belt 20. Sheave 18 is fixed on input member 22 of overriding clutch 24. Clutch input 22 is rotatably mounted on output member 26 on ball bearings 28. The output member is provided with three peripheral notches 30, each of which loosely carries cylindrical roller 32 for free movement by gravity or centrifugal force. Input member 22 is provided with one notch 34 which is complementary to output notches 30. When starting the engine, one of rollers 32 in notches 30 will be in position to drop into the input notch as it travels past the notch. This allows the input to pick up the roller and wedge it between the input and output notches as the input rotates counter-clockwise (Fig. 3), thus allowing the input to drive the output which is fixed on sleeve or shaft 36. Shaft 36 is rotatably mounted on driven shaft 38 on bearings 40, 42.

The input side of centrifugal clutch 44 is fixed on sleeve 36 for rotation therewith and comprises a dished or frusto-conical member 46 provided with a plurality of hardened steel channels 48 respectively engaging balls 50 which are also engaged by the hardened channels 52 carried on plate 54. The latter channels are provided with formed tongues 56 which center plate 54 on shaft 36 and serve as rests for balls 50 and as seats for spring 58 compressed between the tongues and annular seat 60 on sleeve 36. The spring urges member 54 toward dished member 46 in opposition to centrifugal force. When the rotational speed of the clutch is high enough, the balls will force plate 54 to the right (Fig. 1) to forcibly sandwich friction disk 62 between the plate and clutch output 64. This causes the output to start rotating. Clutch output 64 is fixed on driven shaft 38 which is provided with internal spline 66 and output sheave 68 for taking off power.

With the engine driving through overriding clutch 22 a low speed ratio is provided due to the drive from sheave 10 to the larger sheave 18. As the engine picks up the load and increases speed, the transmission will automatically shift to a higher speed ratio when speed responsive overriding clutch 70 engages. This clutch includes rotor 72 fixed on engine shaft sleeve 12 and provided with notch 74 containing peripherally slotted roller 76. Cantilever type spring 78 is staked in peripheral slot 80 in rotor 72 at 82 and passes through the roller slot to urge the roller inwardly with a force determined by the position of the stake. Thus the closer the stake is to the roller supporting end of the spring the greater will be the spring force. When the rotor speed is great enough to throw the roller outwardlly by centrifugal force the roller will wedge in notch 84 in output member 86 rotatably mounted on bearing members 87, 87. The output carries sheave 88 which then drives through V-belt 90 to small sheave 92 fixed on sleeve 36. Prior to engagement of overriding clutch 70, the output thereof is driven by belt 90 but such action has no effect on the clutch. Since speed is decreased from shaft 14 to sleeve 36 and from sleeve 36 to the output of clutch 70, output 86 rotates slower than the rotor until the clutch engages. When clutch 70 engages, sleeve 36 is driven at high speed and the output of clutch 24 overrides the input since there can no longer be any wedging action between the parts.

It will be appreciated that clutch 24 engages at low engine speed when clutch input 22 is driven. If the speed is low enough the engine may idle without turning the driven sheave 68. As the engine speed increases, balls 50 in clutch 44 are thrown outwardly against the force of spring 58 to cause plate 54 to sandwich friction disk 62 against clutch output member 64 and drive shaft 38 at a lower speed than the engine shaft. At this time the output of speed responsive overriding clutch 70 is driven by belt 90 at a speed lower than the driven shaft speed (which is lower than the engine shaft speed). When the engine shaft reaches a predetermined speed, roller 76 is thrown away from rotor 72 and is wedged between rotor notch 74 and output notch 84 to engage the clutch. The driven shaft 38 is now driven at a higher speed than the engine shaft while the output 26 of clutch 24 overrides the relatively slow moving clutch input 22.

If, while the transmission is in high, the load is increased to the point where the engine speed is reduced and stalling appears imminent, the speed ratio may be decreased to low by momentarily decreasing the engine throttle to allow slight movement between the input and output of clutch 70 and permit spring 78 to pull roller 76 into notch 74, thus disengaging clutch 70 and placing clutch 24 back into operation. Such a step-down is possible, of course, only when the speed of engine shaft 14 and clutch rotor 72 are below the engaging speed of the clutch. If the engine speed were not momentarily decreased, such a reduction of the speed ratio would be difficult to obtain due to the manner in which roller 76 is wedged between the clutch input and output.

If the load tends to overrun, the engine output 86 of clutch 70 will override input 72 (or, if the transmission is in low, output 26 of clutch 24 will override input 22). Speed responsive clutch 44 will not be overridden and will disengage only if the speed drops below the engaging speed.

Speed responsive clutch 44 is employed to allow the engine to idle. This is desirable in most instances, but should the idling feature be considered unimportant the clutch could be eliminated and shaft 36 could be the driven shaft. Various details of this clutch are considered novel and are claimed in my co-pending application for "Centrifugal Clutch," Serial No. 160,307, filed May 5, 1950. The mounting of the clutch input on the shaft driven by the clutch output is claimed in my co-pending application for "Clutch," Serial No. 160,308, filed May 5, 1950, now Patent No. 2,665,790, dated January 12, 1954. My co-pending application for "Clutch and Starter," Serial No. 161,382, filed May 11, 1950, shows a similar clutch for delivering power from an engine to a wheel, for example, with a speed responsive overrunning clutch similar to clutch 70 in the instant application for feeding power from the wheel to the engine for starting purposes. Further details of the speed responsive overrunning clutch may be seen in said "Clutch and Starter" application.

Overrunning clutch 24 is provided with three notches 30 to insure that one of rollers 32 will be in position to drop into input notch 34 when starting. More notches may be provided, of course, and fewer may be employed although such a practice would not be considered as being completely satisfactory. The operating characteristics of clutch 44 may be changed by varying the size of balls 50 or the force of spring 58 to increase or decrease the engaging speed of the clutch, as fully explained in said "Centrifugal Clutch" application. The spring rate of spring 73, the weight of roller 76, or the position of the spring stake 82 may be varied to affect the engaging speed of speed responsive overriding clutch 70, as fully explained in said "Clutch and Starter" application.

In the modification illustrated in Figs. 4 through 6, speed responsive centrifugal clutch 90 is mounted on sleeve 92 which is keyed to shaft 14 projecting from engine housing 16. This clutch is similar to clutch 44 in the modification shown in Figs. 1 through 3 and includes an input portion comprising dished plate 94 and plate 96. Dished plate 94 is provided with channels 98 and the flat plate 96 is provided with channels 100 which include the formed tongue 102 which serves as a seat for compressed spring 104, as a rest for balls 106 and to center plate 96 on sleeve 92. When the speed of shaft 14 reaches the engaging speed of clutch 90, plate 96 is moved to the left against the force of spring 104 to sandwich friction disk 108 against output plate 110 to cause rotation of sheaves 112, 114 mounted on sleeve 116. Sleeve 116 is rotatable on bearing pieces 118, 120 to permit the sheaves to idle while shaft 14 rotates at a speed lower than the engaging speed of clutch 90.

When clutch 90 engages, sheave 112 and V-belt 122 turn sheave 124 to drive shaft 126 through overriding clutch 128 (similar to clutch 24 in the first modification). Shaft 126 may be loaded directly or it may serve as a jack-shaft. As the engine picks up the load the speed of shaft 126 increases to throw roller 130 outwardly against the force of spring 132 into notch 134 to pick up sheave 136. This causes the power to be transmitted to shaft 126 at a high speed ratio resulting in clutch 128 being overridden. Overriding speed responsive clutch 138 is similar to clutch 70 in the first modification.

The operation and functioning of the two modifications is the same. In the first modification the two overriding clutches 24, 70 feed into the centrifugal speed responsive clutch 44 while in the second modification the centrifugal clutch 90 feeds into the overriding clutches 128, 136. The second modification is advantageous since it permits of greater versatility in manufacture. Thus the speed responsive clutch 90 is useful per se and may be manufactured for separate sale or with the overriding clutches 128, 138. With slight modification the overriding clutch unit may be made useful as a separate item. To effect such a change, clutch 128 is reversed on shaft 126 (so that Fig. 5 would represent the section viewed from the opposite direction) so it will drive from the center out to sheave 124. Since clutch 138 drives outwardly the two clutches may now be employed to give a two speed drive where the idling feature is not necessary. An example of such use would be an electric drive for a conveyor where the low speed is employed while picking up the load.

With the above description and remarks in mind it will be appreciated that this invention is not to be limited to the instant disclosure but is to be limited only by the scope of the claims.

I claim:

1. A transmission including an engine shaft, a driven shaft, a speed responsive overriding clutch on said engine shaft, an overriding clutch on said driven shaft, means for drivingly connecting said engine shaft to said clutch on said driven shaft, and means for drivingly connecting said clutch on said engine shaft to said driven shaft.

2. In the transmission set forth in claim 1, a third shaft, and speed responsive clutch means connecting the driven shaft to the third shaft, the input side of the clutch means rotating with said driven shaft and the output side being fixed with respect to said third shaft.

3. A transmission according to claim 2, in which said driven and third shafts are coaxial and bearing means are provided between the driven and third shafts to permit relative rotation therebetween.

4. In a transmission, an engine shaft, a driven shaft, an overriding clutch having its output rotatable with respect to said driven shaft and its input rotatable with respect to the output, a speed responsive clutch having its input rotatable with said output and its output rotatable with the driven shaft, a speed responsive overriding clutch mounted on the engine shaft with its input rotatable with the engine shaft and its output rotatable with respect to the input, means for transmitting rotational movement of said engine shaft to the input of said overriding clutch on said driven shaft at a low speed ratio, and means for transmitting rotational movement from the output of said speed responsive overriding clutch to the output of the overriding clutch on the driven shaft and to the input of said speed responsive centrifugal clutch at a high speed ratio while causing the output of the overriding clutch on said driven shaft to override the input thereof.

5. In a transmission, an engine shaft, a driven shaft, an intermediate shaft rotatably mounted on the driven shaft, a speed responsive overriding clutch mounted on the engine shaft and drivingly connected to said intermediate shaft when the engine shaft exceeds a predetermined speed, an overriding clutch mounted on said intermediate shaft and driven by said engine shaft when engaged, the latter clutch being overridden by the former when the former engages, and a centrifugal clutch having its input rotatable with said intermediate shaft and its output rotatable with said driven shaft, said centrifugal clutch engaging when the speed of the intermediate shaft exceeds a predetermined speed.

6. A transmission comprising, a drive shaft, a driven shaft, a speed responsive clutch on the drive shaft and being engaged at all speeds in excess of a predetermined speed, an overriding clutch on the driven shaft, a speed responsive clutch on the driven shaft and responsive to the speed of the driven shaft, means connecting the first speed responsive clutch to the overriding clutch and the second speed responsive clutch, said means providing a low speed ratio when said overriding clutch is engaged and a high speed ratio when the second speed responsive clutch is engaged, said overriding clutch being overridden when the second speed responsive clutch is engaged.

7. A transmission comprising, a drive shaft, a driven shaft, a speed responsive clutch on said drive shaft and being engageable at all drive shaft speeds above a predetermined speed, an overriding clutch on the driven shaft, a speed responsive clutch on the driven shaft, means connecting the output of the first speed responsive clutch to the input of the overriding clutch and providing a low speed ratio between the shafts, means connecting the output of the first speed responsive clutch to the input of the second speed responsive clutch and providing a high speed ratio between the shafts, said overriding clutch being overridden when the second speed responsive clutch is engaged.

8. A transmission comprising, a pair of shafts, a speed responsive clutch having an input side and an output side engageable at all speeds above a predetermined speed, an overriding clutch on one side of said speed responsive clutch, a speed responsive clutch on the same side of the first said speed responsive clutch as the overriding clutch, the first said speed responsive clutch and either the overriding clutch or the second said speed responsive clutch comprising the driving connection between the shafts, the overriding clutch being overridden when the second said speed responsive clutch is engaged, the first said speed responsive clutch having a lower engaging speed than the second said speed responsive clutch.

9. A transmission including an engine shaft and a driven shaft, an overriding clutch on each shaft, the clutch on said engine shaft having its input side rotatable with the shaft and its output drivingly connected to said driven shaft, the output side of the clutch on said driven shaft being rotatable with said driven shaft, the input of the clutch on the driven shaft being drivingly connected to said engine shaft, a third shaft rotatable with respect to said driven shaft and a speed responsive clutch connecting said driven shaft to said third shaft, the input of said speed responsive clutch being fixed with respect to said driven shaft and the output being fixed with respect to said third shaft.

10. A transmission according to claim 9 in which said driven shaft is rotatably mounted on said third shaft.

11. A transmission comprising first clutch means including a speed-responsive clutch engageable at all speeds above a predetermined speed, plural transmission trains operatively connected to said first clutch means, one of said transmission trains including an overriding clutch and another of said transmission trains including a speed-responsive clutch, said second-mentioned speed-responsive clutch having a minimum engaging speed above the minimum engaging speed of the first-mentioned speed-responsive clutch means, and said overriding clutch being overridden when the second-mentioned speed-responsive clutch is engaged.

12. A transmission comprising a shaft, an overriding clutch on the shaft and engageable when its input tends to rotate faster than its output, and a speed-responsive overriding clutch on the shaft and having a minimum engaging speed greater than the speed at which the first said overriding clutch engages and being engageable when its input tends to rotate faster than its output, the first said overriding clutch being overridden when said speed-responsive clutch is engaged, plural transmission trains connected respectively to the input sides of said overriding clutch and said speed-responsive overriding clutch, a second shaft, and speed-responsive means for operatively connecting said transmission trains to said second shaft at all speeds above a predetermined speed which is less than the speed of engagement of said speed-responsive overriding clutch.

13. A transmission comprising a pair of shafts, an overriding clutch on one shaft and including a sheave, a speed-responsive clutch on said one shaft and including a sheave, a pair of sheaves on the other of said shafts, a belt connecting each of the last-named sheaves to one of the clutch sheaves, said overriding clutch being overridden when said speed-responsive clutch is engaged, and a speed-responsive clutch on said other shaft and responsive to the speed thereof for driving the sheaves on said other shaft whenever the rotational speed of said other shaft exceeds a predetermined speed.

14. A pair of shafts, a speed-responsive clutch having input and output sides engageable at all speeds above a predetermined speed and forming a portion of a driving connection between the shafts, another speed-responsive clutch and an overriding clutch operatively connected to one side of the first speed-responsive clutch and completing the driving connection between the shafts, said other speed responsive clutch having a minimum engaging speed greater than the minimum engaging speed of the first speed-responsive clutch, said overriding clutch being overridden when said other speed responsive clutch is engaged.

15. A transmission comprising a pair of shafts, means for connecting the shafts and including a centrifugal clutch engageable at all speeds above a predetermined speed, and two overriding clutches, each of the overriding clutches being engageable when its input tends to rotate faster than its output, one of the overriding clutches being speed-responsive and having a minimum engaging speed above the speed at which the other overriding clutch engages, the other overriding clutch being overridden when said one overriding clutch is engaged, and means for connecting the centrifugal clutch to said overriding clutches to transmit power from one shaft to the other.

16. A transmission comprising speed changing clutch means having an input side and an output side and including two overriding clutches having their inputs rotatable at proportional speeds and their outputs rotatable at proportional speeds so they may be driven by the same source and have a common output, one of said overriding clutches being engageable whenever its input speed exceeds its output speed, the other of the overriding clutches having an input element and an output element with one of the elements including means for effecting a driving connection between the elements when the rotational speed in the driving direction of said one element exceeds a predetermined speed and the input element tends to overrun the output element, engagement of said other clutch being operable to override said one clutch, and a speed-responsive centrifugal clutch operatively connected to one side of said clutch means and operable to engage and complete the transmission when driven above a predetermined speed and being operative to disengage below said predetermined speed to thereby permit the motive source to idle.

17. A transmission comprising a speed changing clutch means for transmitting power between shafts and including an overriding clutch engageable at any speed when the rotational speed of its input exceeds the rotational speed of its output, and a speed-responsive overriding clutch having an input element and an output element and being engageable when the speed of one of the elements exceeds a predetermined speed and the input element tends to rotate faster than the output element, said speed-responsive clutch being operable to override the first-named overriding clutch, said speed changing clutch means having an input side and an output side and including a speed-responsive clutch engageable at all speeds in excess of a predetermined speed and operatively connected to one side of said speed changing clutch means.

References Cited in the file of this patent

UNITED STATES PATENTS

| Number | Name | Date |
|---|---|---|
| 1,102,378 | Zeitler | July 7, 1914 |
| 1,734,491 | Keller | Nov. 5, 1929 |
| 1,979,077 | Pilaar | Oct. 30, 1934 |
| 1,983,827 | Winther et al. | Dec. 11, 1934 |
| 2,143,325 | Kreis | Jan. 10, 1939 |
| 2,172,991 | Segard | Sept. 12, 1939 |
| 2,219,812 | Hochstetter | Oct. 29, 1940 |
| 2,496,937 | Edwards | Feb. 7, 1950 |
| 2,534,134 | Kirkpatrick | Dec. 12, 1950 |
| 2,538,667 | Chamberlin | Jan. 16, 1951 |